United States Patent [19]

Angermaier et al.

[11] Patent Number: 5,377,535
[45] Date of Patent: Jan. 3, 1995

[54] METHOD FOR IDENTIFYING AND CORRECTING ERRORS IN TIME MEASUREMENTS ON ROTATING SHAFTS

[75] Inventors: Anton Angermaier, Landshut; Thomas Vogt, Regensburg; Manfred Wier, Wenzenbach, all of Germany

[73] Assignee: Siemens Aktiengesellschaft, Munich, Germany

[21] Appl. No.: 107,216

[22] Filed: Aug. 16, 1993

[30] Foreign Application Priority Data

Aug. 14, 1992 [EP] European Pat. Off. ........ 92113916.8

[51] Int. Cl.⁶ .......................................... G01M 15/00
[52] U.S. Cl. ................................. 73/116; 324/207.25
[58] Field of Search .......................... 73/116, 117.3; 324/207.25

[56] References Cited

U.S. PATENT DOCUMENTS

| | | |
|---|---|---|
| 4,216,419 | 8/1980 | Van Dam et al. ............ 318/327 |
| 4,814,704 | 3/1989 | Zerrien, Jr. et al. ........ 324/207.25 |
| 4,858,158 | 8/1989 | Ishikawa ................... 324/207.25 |
| 5,117,681 | 6/1992 | Dodsall et al. .............. 73/116 |
| 5,237,862 | 8/1993 | Mangrulkar et al. ........... 73/116 |

FOREIGN PATENT DOCUMENTS 0039900 11/1981 European Pat. Off. .
0353216 1/1990 European Pat. Off. .
3506233 10/1985 Germany .

*Primary Examiner*—Robert Raevis
*Assistant Examiner*—James M. Olsen
*Attorney, Agent, or Firm*—Herbert L. Lerner; Laurence A. Greenberg

[57] ABSTRACT

A method for identifying and correcting errors in time measurement on rotating shafts, particularly on crankshafts or shafts connected thereto in internal combustion engines, whereby the shafts are provided with marks which are scanned with sensors. The segment times required by the shaft to rotate about a defined angular distance are measured and compared with a reference segment.

18 Claims, 2 Drawing Sheets

METHOD FOR IDENTIFYING AND CORRECTING ERRORS IN TIME MEASUREMENTS ON ROTATING SHAFTS

BACKGROUND OF THE INVENTION

1. Field of the Invention

The invention relates to a method for identifying and correcting errors in time measurements on rotating shafts, particularly on crankshafts or shafts in internal combustion engines connected thereto.

Time measurement of this kind is effected in that the shaft itself or a tachometer disk connected thereto carry marks that are scanned by sensors. The time required by the shaft to traverse a specific angle of rotation is measured. In general, the rotational speed or rpm can be measured in this manner. More particularly, rpm fluctuations can be detected with arbitrarily accurate resolution at the circumference of the shaft or the tachometer disk, depending on the spacing of the marks.

Such measurements are used in internal combustion engines, for example, for identifying erratic combustion or misfiring via short-term slowing of the angular speed of the crankshaft. In the process the spacings of the markings on the crankshaft or the tachometer disk correspond to the stroke cycles of the individual cylinders.

However, if the markings or the tachometer disk have mechanical defects or inaccuracies, the angular speed measurement is distorted. For instance, angular errors of the segments or marking teeth of the tachometer disk, disk backlash or variance in the tooth formation can cause such distortions.

SUMMARY OF THE INVENTION

It is accordingly an object of the invention to provide a method for identifying and correcting errors in time measurements at rotating shafts, which overcomes the hereinafore-mentioned disadvantages of the heretofore-known methods and devices of this general type and which permit the identification of such errors and appropriate correction of the measured time values.

With the foregoing and other objects in view there is provided, in accordance with the invention, in a method for determining a segment time required for a segment of a rotating shaft, preferably a crankshaft of an internal combustion engine with z cylinders, to rotate about a defined angular distance, in which the shaft or a tachometer disk connected thereto are provided with marks which are scanned by an associated sensor, a method for identifying and correcting errors in determining the segment time, which comprises:

measuring and storing a reference segment time ($TG_0$) of a reference segment associated with a reference cylinder;

subsequently measuring segment times ($TG_n$) of crankshaft segments associated with respective individual cylinders for each of the cylinders (n);

measuring and storing a new segment time ($TG_0'$) of the reference segment associated with the reference cylinder two full crankshaft rotations later; and calculating correction values ($AZ_n$) for each of the cylinders (n), in accordance with an equation $$AZ_n = \frac{TG_n - TG_0}{TG_0} + \frac{n}{z} * \frac{TG_0 - TG_0'}{TG_0}$$

subsequently averaging respective correction values ($AZ_n$) and storing the averaged correction value ($AZM_n$); and correcting the measured segment times ($TG_n$) with the averaged correction value ($AZM_n$) for forming corrected segment times ($TK_n$) according to an equation $$TK_n = TG_n * (1 - AZM_n).$$

In accordance with an added feature of the invention, the correction values are calculated during a thrust cutoff operating state of the engine, i.e. an operating state of the engine during which no fuel is supplied.

In accordance with an additional feature of the invention, the correction values are calculated only within a given range of rotational speeds of the engine. Alternatively, or additionally, a threshold value of a rotational speed is established, and the correction values are calculated only below the threshold value.

In accordance with another feature of the invention, the values are averaged with a sliding average according to the equation $$AZM_n = AZM_{n-1} * (1 - MITKO) + AZ_n * MITKO$$

where n is a dummy index, z is the number of segments or cylinders, and MITKO is a predetermined averaging constant between zero and one.

In accordance with a further feature of the invention, the correction values are initialized with initialization values, preferably zero, during a first start of engine operation, and the correction values ($AZ_n$) are set for each further start of operation to values determined and stored during a preceding engine operation, and the correcting step is only performed after the calculating step has been performed a predetermined number (ZS) of times. The predetermined number (ZS) may be a value which is inversely proportional to the averaging constant (MITKO).

With the foregoing and other objects in view, there is also provided, in accordance with the invention, in a method for determining a segment time required by a rotating shaft, particularly a crankshaft of an internal combustion engine with z cylinders, to rotate about a defined angular span, wherein the crankshaft or a tachometer disk connected thereto are provided with marks which are scanned by an associated sensor, a method for identifying and correcting errors in determining the segment time, which comprises: measuring and storing a reference segment time ($TB_0$) of a reference segment, preferably associated with a reference cylinder; measuring and storing consecutive segment times ($TB_n$) of all segments of the rotating shaft; measuring and storing the reference segment time ($TB_0'$) of the reference segment one crankshaft rotation later; calculating correction values ($BZ_n$) for respective ones of the segments (n) according to an equation $$BZ_n = \frac{TB_n - TB_0}{TB_0} + \frac{n}{z/2 * TB_0} * (TB_0 - TB_0'),$$

subsequently averaging the correction values and storing the averaged correction values ($BZM_n$); correcting the actually measured segment times ($TB_n$) with the averaged correction values ($BZM_n$) according to an equation $$TBK_n = TB_n * (1 - BZM_n).$$

With the first embodiment of the invention, the segment times for a reference element are measured at intervals of two crankshaft rotations. In this way it is possible to compensate for a general change in rpm tendency that would otherwise lead to erroneous corrections. The further segment times measured between these two measurements are compared to this reference segment, and a correction factor that permits a correction of the measured segment time for individual cylinders is determined as a function of the calculated time difference.

With the second embodiment of the invention, the segment times for a reference element are measured at intervals of one crankshaft rotation. In doing so it is again possible to compensate for a general change in the rpm tendency that would otherwise lead to erroneous corrections. The further segment times measured between these two measurements are compared with this reference segment, and a correction value that permits a correction of the measured segment time for individual segments is determined as a function of the calculated time difference.

As described at the outset, time variations with successive measurements of angular segments can have different causes. They can stem from an actual change in the angular speed of the crankshaft or defective, unequal segment sizes between the individual crankshaft markings.

It is certain that the measured differences actually arise because of varying segment sizes. Influences on time errors, i.e. between the segment times, dictated by ignition and combustion must be ruled out. Error identification and error correction in accordance with the methods of the invention are therefore preferably executed during the operating state of thrust cutoff, i.e. while the fuel supply is cut off.

Further details may be found in applicants' European patent application No. 92 11 3917.6, filed Aug. 14, 1992, corresponding to copending U.S. patent application No. 08/107,217, which is herewith incorporated by reference. Other features which are considered as characteristic for the invention are set forth in the appended claims.

Although the invention is illustrated and described herein as embodied in a method for identifying and correcting errors in time measurements on rotating shafts, it is nevertheless not intended to be limited to the details shown, since various modifications and structural changes may be made therein without departing from the spirit of the invention and within the scope and range of equivalents of the claims.

The method of operation of the invention, however, together with additional objects and advantages thereof will be best understood from the following description of specific embodiments when read in connection with the accompanying drawings.

DESCRIPTION OF THE PREFERRED EMBODIMENT

Figure 1:
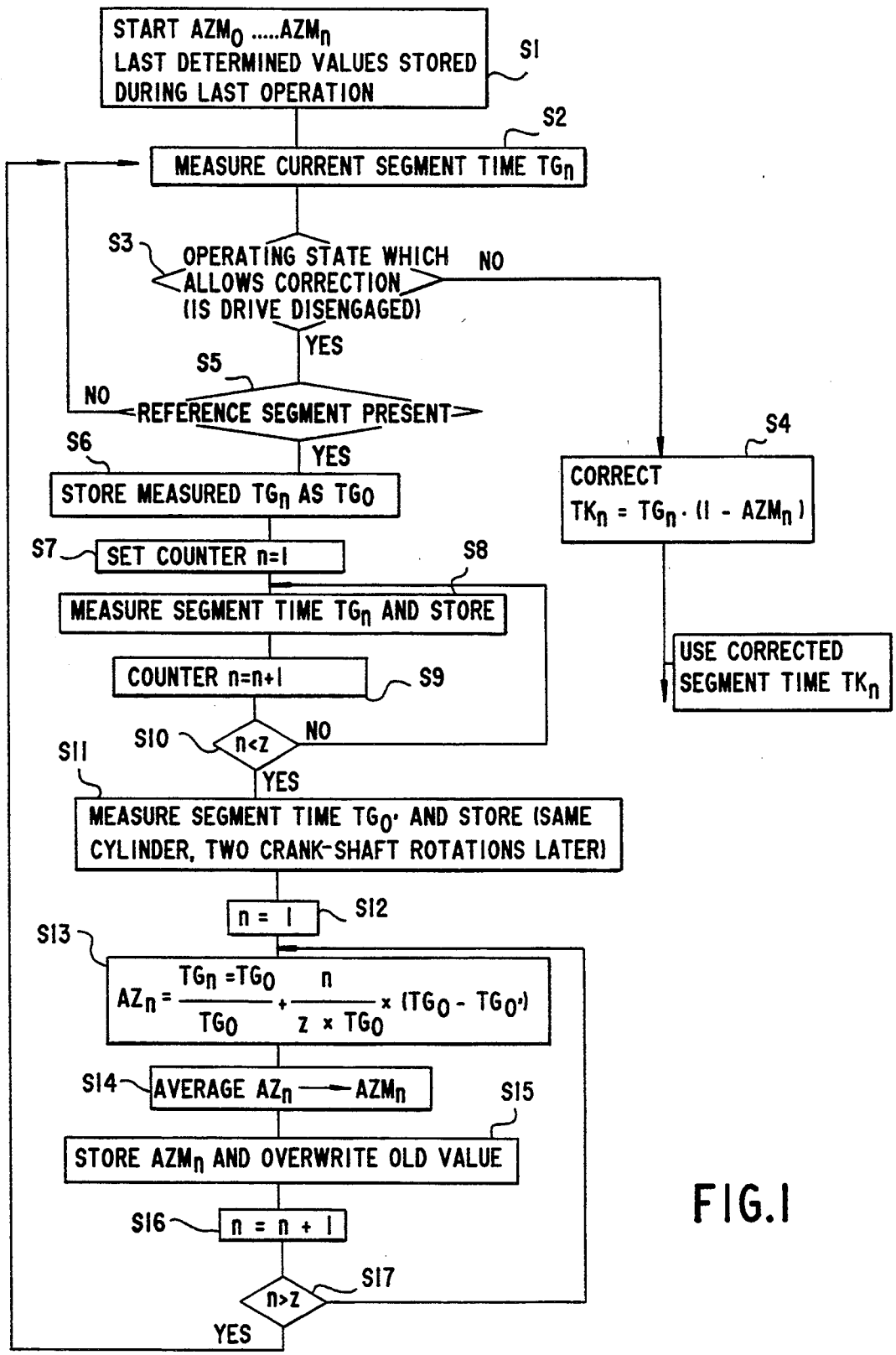
FIG. 1 is a flow chart of a first embodiment of the method according to the invention for determining correction values for individual cylinders.

Referring now to the figures of the drawing in detail, and first, particularly, to FIG. 1 thereof, a method step S1 designates correction values which are adopted at the start of operation. These values were stored as the values that were determined during the last engine operation. After new correction values have been determined, these old correction values are overwritten. During the very first engine operation the correction values are initialized with initialization values, preferably with zero.

In a method step S2 the segment time $TG_n$ of the current segment n is measured.

In a method step S3 a check is performed as to whether the engine is in an operating state which permits the calculation of new correction values. A suitable operating state which allows a dependable measurement is thrust cutoff, i.e. when fuel delivery to the engine is turned off. The calculation of correction values can also be limited to a specific rpm range in order to avoid engine-specific errors. To avoid possible error correction with a dramatically changing rpm, the calculation of new correction values can be omitted during such markedly unsteady operations.

If no suitable operating state is available, no new correction values are calculated. Instead, the old, last stored correction values are used. In that case, the flow branches to a method step S4, in which the measured segment time $TG_n$ is corrected. The correction is done with an associated correction value $AZM_n$ in accordance with the equation $$TK_n = TG_n * (1 - AZM_n).$$

The segment time $TK_n$ corrected in this manner can then be arbitrarily used in any of those operations that require information regarding the rotational speed of the crankshaft and particular changes in these speeds.

However, if the current operating state permits the calculation of new correction values, the process is not branched to S4, but instead to a method step S5, in which a check is made of whether the measured segment time was the time of the reference time. An arbitrary segment can be selected as the reference segment. It is advantageous if the first segment in the ignition sequence is selected. This segment is defined as being free from defects.

If the segment time of the reference segment was not measured, the process returns to step S2 and measures the next segment time $TG_n$.

As soon as a positive answer is obtained in S5, i.e. if the reference segment was measured, a method step S6 follows, where the measured segment time $TG_n$ is stored as the segment time of the reference segment $TG_n$.

In the following method steps S7 through S10, the segment times of the successive segments logically associated with the individual cylinders are measured consecutively:

In a method step S7 a counter is set to an initial value of n=1. In a method step S8 the current segment time $TG_n$ is measured and stored. In a method step S9 the counter is advanced by 1. A query in step S10 determines whether or not the counter n has reached the number of cylinders z, i.e. if a segment time for each cylinder has been measured. Once the segment times for all of the segments associated with the individual cylinders have been determined, the process continues with a method step S11, in which the segment time of a reference segment $TG_0'$ is measured and stored. The segment $TG_0'$ corresponds to $TG_0$ but now two crankshaft rotations later.

Then the correction values for the individual segments associated with the cylinders are calculated consecutively in the following method steps S12 through S17:

In a method step S12 a counter is set to an initial value of n=1. In a method step S13 the correction value $AZ_n$ for the individual cylinder is calculated in accordance with the equation $$AZ_n = \frac{TG_n - TG_0}{TG_0} + \frac{n}{z} * \frac{TG_0 - TG_0'}{TG_0}$$

where z represents the total number of cylinders. This equation applies to four-cycle engines.

The correction value $AZ_n$ is subsequently averaged (method step S14). The mean is arrived at, for instance, by a sliding averaging in accordance with the equation $$AZM_n = AZM_{n-1} * (1-MITKO) + AZ_n * MITKO.$$

The term MITKO is an averaging constant or weighting constant, and n is a dummy index for the averaging operation (it does not correspond to the segment numbers). The averaging is recommended because any systematic errors of the segments are superimposed onto the coincidental errors such as fluctuations of the system clock speed underlying the control system, tolerances with the switching accuracy of the sensors and general oscillations or malfunctions originating in the drive train.

The newly determined mean correction value is stored in that the old correction value is overwritten (method step S15).

In method step S16 the counter is advanced by 1.

After all the required correction values have been determined, the process flow loops back from method step S17 to method step S2.

So that the next segment times can immediately be enlisted to determine correction values, provided that the operating state of the engine permits it, the segment time $TG_0'$ measured last is used in the next cycle as the new segment time $TG_n$ to be measured.

It is thus seen that the method according to the invention permits the determination of correction values for individual cylinders.

Figure 2:
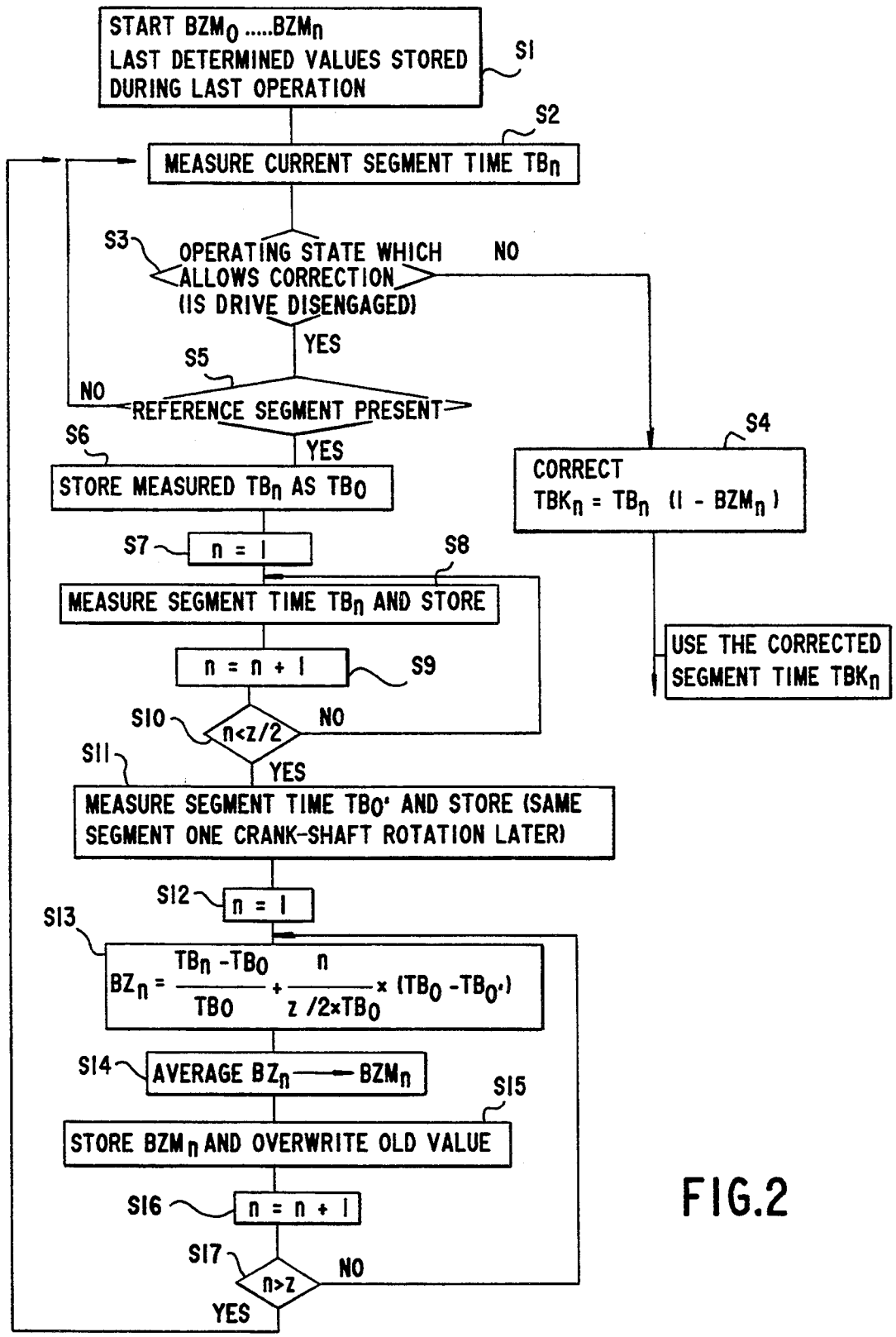
FIG. 2 is a flow chart of a second embodiment of the method according to the invention for determining correction values for individual segments.

Referring now to FIG. 2, which describes an alternative embodiment of the method illustrated in FIG. 1, correction values for individual segments are used.

Method steps S1 through S4 correspond to the respective method steps in FIG. 1.

In method step S5 a query is performed as to whether or not the measured segment time is that of the reference segment. The reference segment differs from the reference segment of the first method in that it is no longer associated with a specific cylinder, but a specific, marked segment of the crankshaft that is defined as being free from defects. If the reference segment was not the one measured, method step S2 is repeated and the next segment time is measured.

If the reference segment was the one measured, however, the measured segment time $TB_n$ is stored as the segment time of the reference segment $TB_0$ (method step S6).

In the following method steps S7 through S10, the respective segment time is now measured for all segments located on the crankshaft in the course of one rotation. One-half the number of cylinders is used as the upper limit for the number of segments. The method is thus only suited for even-numbered cylinder counts.

In method step S11 the segment time $TB_0'$ of the reference segment of a crankshaft rotation is later measured and stored.

Now the correction values for the individual segments are calculated consecutively in method steps S12 through S17, in accordance with the equation $$BZ_n = \frac{TB_n - TB_0}{TB_0} + \frac{n}{z/2} * \frac{TB_0 - TB_0'}{TB_0}$$

The total number of cylinders is represented by z. This equation applies to four-cycle engines.

The correction values are then averaged (method step S14), for example according to the sliding averaging equation $$BZM_n = BZM_{n-1} * (1-MITKO) + BZ_n * MITKO,$$

where MITKO is a weighting constant.

These mean correction values are stored in that the old correction values are overwritten (method step S15).

When the correction values for all of the segments have been determined, the flow returns from method step S17 to method step S2. In this case as well, the segment time $TB_0'$ that was measured last is used as the new segment time $TB_0$ in the next cycle, provided that the operating state permits the next segment times to be enlisted immediately in determining correction values.

We claim:

1. In a method for determining a segment time required for a segment of a rotating crankshaft of an internal combustion engine with z cylinders to rotate about a defined angular distance, in which the crankshaft or a tachometer disk connected thereto are provided with marks which are scanned by an associated sensor, a method for identifying and correcting errors in determining the segment time, which comprises:

measuring and storing a reference segment time ($TG_0$) of a reference segment associated with a reference cylinder;

subsequently measuring segment times ($TG_n$) of crankshaft segments associated with respective ones of the cylinders;

measuring and storing a new segment time ($TG_0'$) of the reference segment associated with the reference cylinder two full crankshaft rotations later; and calculating correction values ($AZ_n$) for each of the cylinders (n) in accordance with an equation $$AZ_n = \frac{TG_n - TG_0}{TG_0} + \frac{n*(TG_0 - TG_0')}{z*TG_0}$$

where z represents a total number of cylinders;

subsequently averaging respective correction values ($AZ_n$) and storing the averaged correction values ($AZM_n$); and correcting the measured segment times (TG$_n$) with the averaged correction value (AZM$_n$) for forming corrected segment times (TK$_n$) according to an equation $$TK_n = TG_n * (1 - AZM_n).$$

2. The method according to claim 1, which comprises calculating the correction values during a thrust cutoff operating state of the engine.

3. The method according to claim 1, which comprises calculating the correction values only within a given range of rotational speeds of the engine.

4. The method according to claim 1, which comprises establishing a threshold value of a rotational speed, and calculating the correction values only below the threshold value.

5. The method according to claim 1, which comprises performing the averaging step by calculating a sliding average according to an equation $$AZM_n = AZM_{n-1} * (1 - MITKO) + AZ_n * MITKO$$

where n is a dummy index and MITKO is a predetermined averaging constant between zero and one.

6. The method according to claim 1, which comprises initializing the correction values with initialization values during a first start of engine operation, and setting the correction values (AZ$_n$) for each further start of operation to values determined and stored during a preceding engine operation, and performing the correcting step only after the calculating step has been performed a predetermined number of times.

7. The method according to claim 6, which comprises initializing the correction values by resetting to zero.

8. The method according to claim 6, which comprises setting the predetermined number of times to a value being inversely proportional to the predetermined averaging constant.

9. In a method for determining a segment time required by a rotating crankshaft of an internal combustion engine with z cylinders to rotate about a defined angular span, wherein the crankshaft or a tachometer disk connected thereto are provided with marks which are scanned by an associated sensor, a method for identifying and correcting errors in determining the segment time, which comprises:

measuring and storing a reference segment time (TB$_0$) of a reference segment associated with a reference cylinder;

measuring and storing consecutive segment times (TB$_n$) of all segments of the rotating shaft;

measuring and storing the reference segment time (TB$_0$') of the reference segment one crankshaft rotation later;

calculating correction values (BZ$_n$) for respective ones of the segments (n) according to an equation $$BZ_n = \frac{TB_n - TB_0}{TB_0} + \frac{n}{z/2 * TB_0} * (TB_0 - TB_0'),$$

where z represents a total number of cylinders;

subsequently averaging the correction values and storing the averaged correction values (BZM$_n$);

correcting the actually measured segment times (TB$_n$) with the averaged correction values (BZM$_n$) according to an equation $$TBK_n = TB_n * (1 - BZM_n).$$

10. The method according to claim 9, which comprises calculating the correction values during a thrust cutoff operating state of the engine.

11. The method according to claim 9, which comprises calculating the correction values only within a given range of rotational speeds of the engine.

12. The method according to claim 9, which comprises establishing a threshold value of a rotational speed, and calculating the correction values only below the threshold value.

13. The method according to claim 9, which comprises performing the averaging step by calculating a sliding average according to an equation $$BZM_n = BZM_{n-1} * (1 - MITKO) + BZ_n * MITKO,$$

where n is a dummy index and MITKO is a predetermined averaging constant between zero and one.

14. The method according to claim 9, which comprises initializing the correction values with initialization values during a first start of engine operation, and setting the correction values for each further start of operation to values determined and stored during a preceding engine operation, and performing the correcting step only after the calculating step has been performed a predetermined number of times.

15. The method according to claim 14, which comprises initializing the correction values by resetting to zero.

16. The method according to claim 14, which comprises setting the predetermined number of times to a value being inversely proportional to the predetermined averaging constant.

17. In a method for determining a segment time required for a segment of a rotating shaft to rotate about a defined angular distance, in which a shaft or a tachometer disk connected thereto are provided with marks which are scanned by an associated sensor, a method for identifying and correcting errors in determining the segment time, which comprises:

measuring and storing a reference segment time (TG$_0$) of a reference segment;

subsequently measuring segment times (TG$_n$) of further segments (n) of the shaft;

measuring and storing a new segment time (TG$_0$') of the reference segment two full shaft rotations later; and calculating correction values (AZ$_n$) for each of the segments (n), in accordance with an equation $$AZ_n = \frac{TG_n - TG_0}{TG_0} + \frac{n}{z * TG_0} * (TG_0 - TG_0')$$

where z represents the total number of segments;

subsequently averaging respective correction values (AZ$_n$) and storing the averaged correction value (AZM$_n$); and correcting the measured segment times (TG$_n$) with the averaged correction value (AZM$_n$) for forming corrected segment times (TK$_n$) according to an equation $$TK_n = TG_n * (1 - AZM_n).$$

18. In a method for determining a segment time required by a rotating shaft to rotate about a defined angular span, in which the rotating shaft or a tachometer disk connected thereto are provided with marks which are scanned by an associated sensor, a method for identifying and correcting errors in determining the segment time, which comprises:

measuring and storing a reference segment time ($TB_0$) of a reference segment;

measuring and storing consecutive segment times ($TB_n$) of all segments of the rotating shaft;

measuring and storing the reference segment time ($TB_0'$) of the reference segment one shaft rotation later; calculating correction values ($BZ_n$) for respective ones of the segments (n) according to an equation $$BZ_n = \frac{TB_n - TB_0}{TB_0} + \frac{n}{z/2 * TB_0} * (TB_0 - TB_0'),$$

where z represents the total number of segments;

subsequently averaging the correction values and storing the averaged correction values ($BZM_n$);

correcting the actually measured segment times ($TB_n$) with the averaged correction values ($BZM_n$) according to an equation $$TBK_n = TB_n * (1 - BZM_n).$$

* * * * *